United States Patent [19]

Kunz et al.

[11] Patent Number: 5,538,055
[45] Date of Patent: Jul. 23, 1996

[54] TANK CLOSURE

[75] Inventors: Georg Kunz, Rosenheim; Angelika B. M. Temmesfeld, Raubling, both of Germany

[73] Assignee: Temetec Fahrzeugtechnik Entwicklungsgesellschaft MbH, Raubling, Germany

[21] Appl. No.: 396,156

[22] Filed: Feb. 27, 1995

Related U.S. Application Data

[63] Continuation-in-part of Ser. No. 165,007, Dec. 9, 1993, abandoned.

[30] Foreign Application Priority Data

Dec. 16, 1992 [DE] Germany .................. 42 42 599.9

[51] Int. Cl.⁶ ..................................... B67D 5/06
[52] U.S. Cl. ...................... 141/312; 141/286; 141/59; 137/588; 220/86.2; 220/746
[58] Field of Search ................. 141/59, 86, 88, 141/286, 312, 302; 220/86.2, 746; 137/312, 587, 588

[56] References Cited

U.S. PATENT DOCUMENTS

| | | | |
|---|---|---|---|
| 3,467,274 | 9/1969 | Schmitt | 220/86 |
| 4,300,699 | 11/1981 | Anhegger | 220/86 R |
| 4,724,861 | 2/1988 | Covert et al. | 137/202 |
| 4,762,247 | 8/1988 | Temmesfeld | 220/303 |
| 4,919,297 | 4/1990 | Ohasi | 220/86 R |
| 5,027,868 | 7/1991 | Morris et al. | 141/59 |
| 5,261,700 | 11/1993 | Martenas et al. | 280/834 |
| 5,271,438 | 12/1993 | Griffin et al. | 141/59 |
| 5,322,100 | 6/1994 | Buechler et al. | 141/312 |

FOREIGN PATENT DOCUMENTS

| | | |
|---|---|---|
| 0223931 | 6/1987 | European Pat. Off. . |
| 0311756 | 4/1989 | European Pat. Off. . |
| 2922876 | 12/1980 | Germany . |
| 3641274 | 6/1987 | Germany . |
| 4102961 | 2/1990 | Germany . |
| 4017912 | 12/1991 | Germany . |

OTHER PUBLICATIONS

European Search Report dated Nov. 11, 1994.
Copy of a official communication of the German Patent Office dated May 8, 1995.

*Primary Examiner*—J. Casimer Jacyna
*Attorney, Agent, or Firm*—Nields & Lemack

[57] ABSTRACT

Tank closure with a self-locking closure apparatus arranged at the orifice rim of a pour-in socket-piece. The closure apparatus consists of a closure part and a pour-in opening which is closable by means of the closure part. Between the rim of the opening and a refueling nozzle to be introduced a gas outlet gap remains for the gases which escape when refueling the tank. A guide is provided for reception of the refueling nozzle. In order to free the exiting gases from fluid droplets, it is provided that the guide exhibits a reduced-scale segment closely surrounding the refueling nozzle. Exit openings are provided at the side of the reduced-scale segment which is placed toward the pour-in socket-piece, through which the gases pass out of the guide to the outside. Inlet openings are arranged at the side of the reduced-scale segment which faces away from the tank, through which the gases in the interior of the guide enter. A lead-apparatus is provided connecting the exit openings and the inlet openings in a moderate flow.

11 Claims, 2 Drawing Sheets

TANK CLOSURE

This application is a continuation-in-part of co-pending application Ser. No. 08/165,007 filed Dec. 9, 1993, now abandoned.

BACKGROUND OF THE INVENTION

1. Field of the Invention

The invention relates to a tank closure with a self-locking closure apparatus arranged at the orifice-rim of a pour-in socket-piece; the closure apparatus consists of a closure part and a pour-in opening which is closable by means of the closure part; between the rim thereof and a refueling nozzle a gas outlet gap remains for the gases which escape during filling of the tank; and with a guide tube for reception of the refueling nozzle.

2. Description of Related Art

When the closure apparatus in the case of such a tank closure is opened with a refueling nozzle, vapors which are under pressure and with them carried-along fluid particles can escape around the refueling nozzle through the gas outlet gap and the fluid particles can injure the person who is using the refueling nozzle. This is especially the case with petrol tank closures, in the case of which the danger arises that petrol splashes reach the face or even the eye of the user.

SUMMARY OF THE INVENTION

The invention is based upon the task of forming a tank closure of the hereinabove mentioned type in which the danger of an injury or annoyance of the user by fluid droplets contained in the gas-outlet stream is largely avoided.

This task is solved, in that the guide tube exhibits a tapered segment and in that exit openings are provided at the side of the tapered segment which lies to the pour-in socket-piece, through which the gases pass out of the guide tube to the outside, and in that inlet openings are arranged at the side of the tapered segment which is turned away from the tank, through which the gases in the interior of the guide tube enter, and in that a lead-apparatus connecting the exit openings and the inlet openings in a moderate flow is provided.

In the tank closure according to the invention the gas stream which escapes from the tank during filling thereof is turned back several times, namely once radially outwardly and thereafter again radially inward in the interior of the guide tube, so that fluid droplets are thrown away onto this path and leave the gas stream.

A lead apparatus, which in a preferred embodiment of the invention consists of a housing which surrounds closely the guide tube and the orifice rim of the pour-in socket, takes care of the turning-back of the gas stream. The vapors which escape from the tank thus cannot escape into the open, but are compelled by the housing to flow again through the inlet openings into the interior of the guide tube.

According to a further embodiment of the invention the guide tube exhibits a stop for a shoulder of the refueling nozzle. Modern refueling nozzles for petrol exhibit a ring collar with slanting surfaces, to which the guide tube is adapted and for which the guide tube forms the mentioned stop.

According to a further development of the invention the guide tube is axially displaceable and advantageously elastically biased in a direction away from the pour-in opening. At the outside of a self-locking closure apparatus dirty water gathers, in particular in the case of tank socket-pieces of motor vehicles, during the course of operation. The danger arises that this dirty water gets to the interior of the tank during opening of the closure apparatus of the refueling nozzle. In order to prevent this, in a further advantageous embodiment of the invention the housing is provided with drain openings at the top of the pour-in opening, which advantageously are closeable during filling of the tank. By means of these drain openings dirty water can be led away, which otherwise would gather in front of the closure apparatus.

Since the drain openings are closeable during filling of the tank, it is prevented that the gases escaping from the tank get to the open in the same route.

The closeability of the drain openings is advantageously achieved in such a way that, in a further advantageous embodiment of the invention, a packing which closes the drain openings upon introduction of the refueling nozzle is arranged in the axially-displaceable guide tube. The packing is so arranged that upon axial displacement of the guide tube by introduction of the refueling nozzle the closure function is fulfilled automatically.

In a further advantageous embodiment of the invention the housing exhibits a projection lying near the stop for the shoulder of the refueling nozzle, in such a way that the shoulder of the refueling nozzle is capable of resting between the stop and the projection. By means of this projection the refueling nozzle is held securely, during filling, in an exactly defined position.

The invention will hereinafter be explained in more detail with reference to two exemplary embodiments shown schematically in the Figures.

DESCRIPTION OF THE PREFERRED EMBODIMENTS

Figure 1:
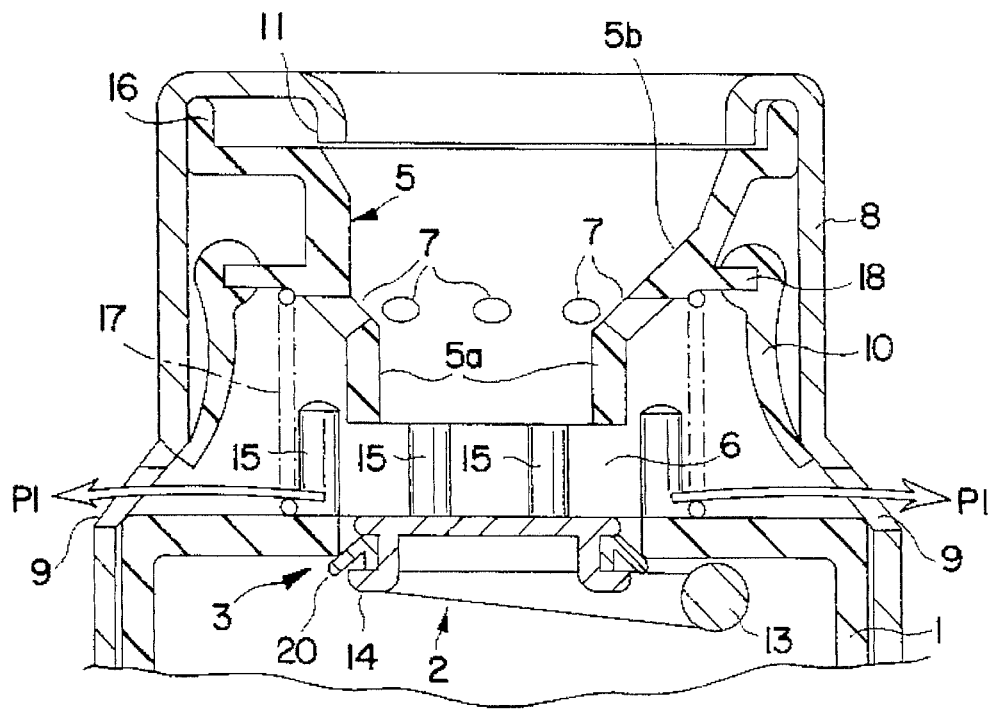
FIG. 1 shows a petrol tank closure in longitudinal section.

In FIG. 1 may be recognized a pour-in socket-piece 1 of a motor vehicle, which exhibits a pour-in opening 3, which is closed off by a closure flap 2. The closure flap 2 consists of a bearing-arm 12, which is rotatably mounted on a shaft 13. By means of a spring (not shown) the bearing arm is biased in the direction of the pour-in opening 3. A closure body 14 is fixed to the bearing arm; the closure body 14 exhibits a circumferential groove in which a packing 20 is arranged. As may be recognized from FIG. 1, the closure body 14 passes with its packing 20 sealingly in the pour-in opening 3, so that in this condition the pour-in opening, especially by the operation of the biasing spring, is tightly closed. At the rim of the pour-in opening 3 of the pour-in socket-piece 1, six pegs 15 extending in the longitudinal direction are arranged, of which only four may be recognized in the sectional representation of FIG. 1. The pour-in socket-piece 1 is in its orifice-region surrounded by a headpiece-type housing 8, which exhibits a somewhat reduced diameter at the side of the pour-in opening facing away from the tank side. The rim of the housing 8 is turned down inwardly at its free end. At one side (left in the drawing) the turned-down rim region forms a rectilinearly running projection 11 (see also FIG. 2). In the top of the closure flap 2, the housing 8 exhibits two drain openings 9.

A guide means 5 (for example, a guide tube) is arranged inside the cylindrical housing 8. The guide tube 5 exhibits a conical segment 5b, which serves as stop for a correspondingly formed ring collar of a refueling nozzle. The conical segment 5b goes over into a cylindrical segment with reduced radius, which is designated hereinafter as reduced-scale segment 5a. In the neighborhood of the conical segment 5b, mounted somewhat further in the direction towards the pour-in opening 3, the guide tube 5 is provided with a total of eight radial borings, which serve as inlet openings 7 for gases escaping from the tank during filling, which will be described in detail hereinafter. The end rim of the guide tube 5 which faces the pour-in opening 3 exhibits a space with respect to the rim of the pour-in opening, so that an annular unobstructed exit opening 6 (or exit openings) is formed, through which gases freely pass out of the guide means 5 to the outside..

The guide tube 5 is axially displaceable inside the housing 8. A cylinder part 16 lying at the inner wall of the housing 8 serves for the axial guidance of the guide tube 5. A tilting of the guide tube 5 during axial displacement is prevented by the rods 15 which surround the cylindrical segment 5a and in this manner present an axial slide-guide. The guide tube 5 is loaded by a compression spring 17, which is supported on the orifice-rim of the pour-in opening 3, in such a manner that it is moved away from the pour-in opening.

The guide-tube 5 exhibits a circumferential plank which is directed radially towards the outside, against which the other end of the compression spring 17 is put. The plank 18 lies above the inlet openings 7 in the drawing, i.e. it is further removed from the orifice opening than the inlet openings 7. The plank 18 carries a circumferential packing 10, which exhibits roughly the form of a truncated-cone jacket. The packing 10 is so dimensioned that it, in the position of the guide tube 5 shown in FIG. 1, does not extend to the pour-in socket-piece 1, and in particular does not close the drain openings 9. In the rest position of the fuel tank closure thus no dirty water can accumulate before the closure flap 2, since this dirty water flows outwardly between the rods 15 along the arrows P1 via the drain openings 9.

Figure 2:
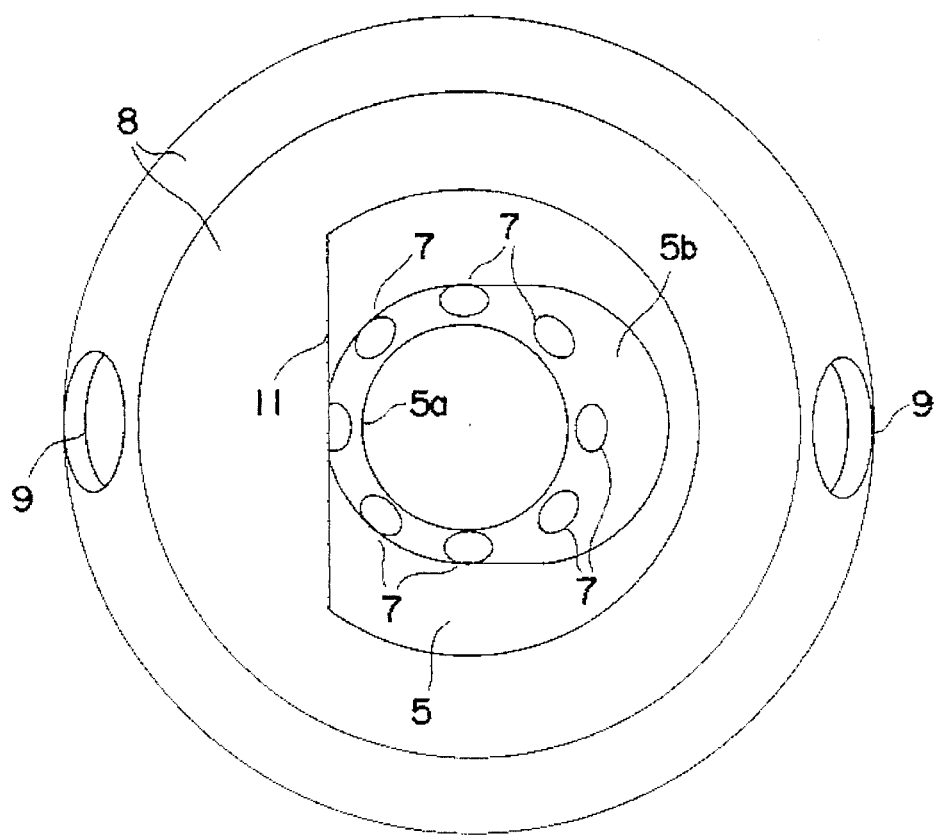
FIG. 2 shows the petrol tank closure according to FIG. 1 in top view.

FIG. 2 shows the fuel tank closure according to FIG. 1 in top view. In particular, one can recognize therefrom the guide tube 5 with its reduced-scale section 5a, the stop 5b and the inlet openings 7. The housing 8, which is provided with the drain openings 9, exhibits (left in the drawing) a projection 11, which has a straight edge.

Figure 3:
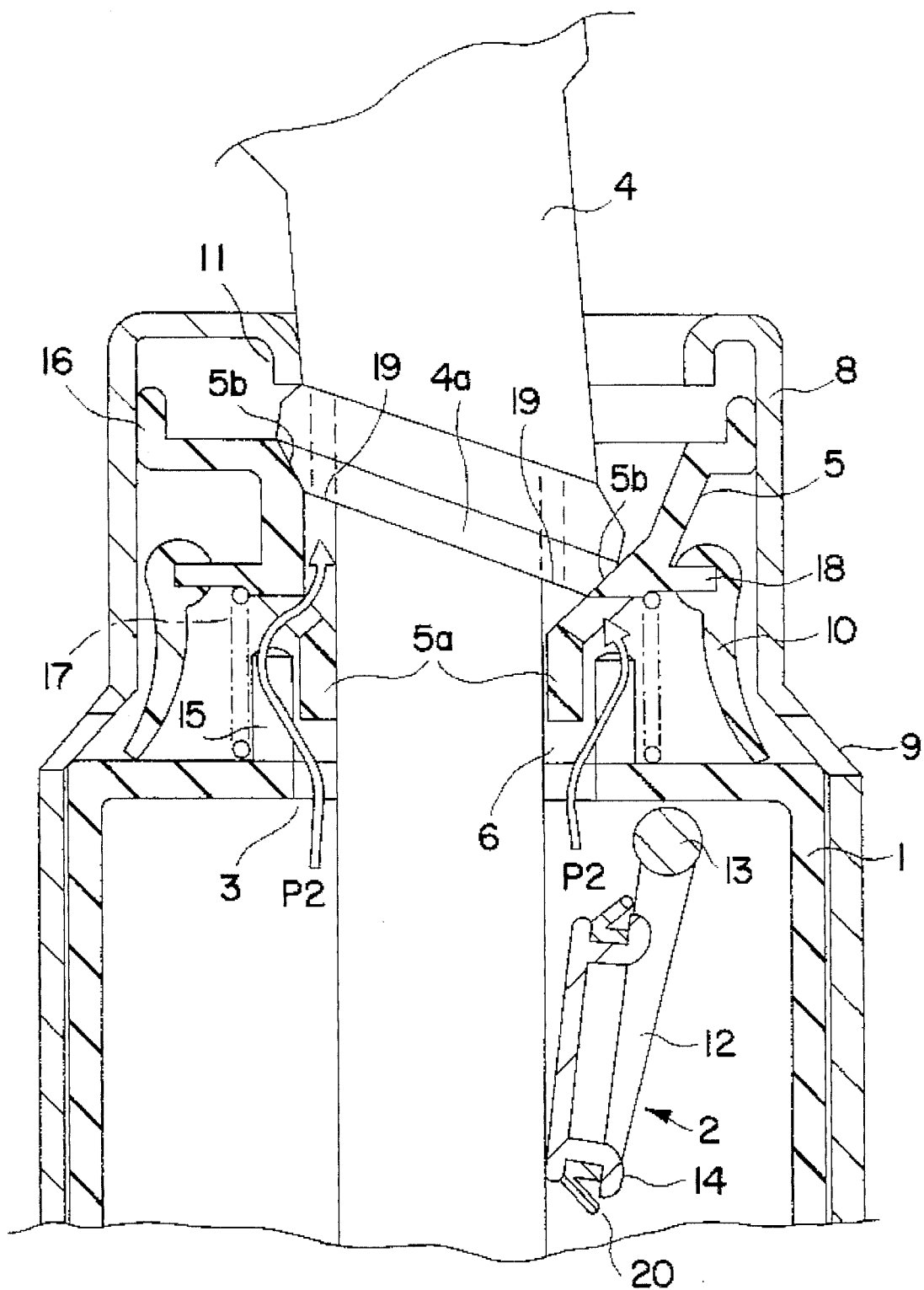
FIG. 3 shows the petrol tank closure as in FIG. 1, but with refueling nozzle inserted.

FIG. 3 shows the fuel tank closure with a fuel refueling nozzle 4 inserted therein. The refueling nozzle 4 exhibits a standard ring collar 4a, in the under side of which are located openings 19 for a gas-suck-off system. By means of the ring collar 4a of the refueling nozzle 4, which strikes against the stop 5b of the guide tube 5, the guide tube 5 is displaced against the operation of the spring 17 in the direction of the pour-in opening 3. The lower edge of the guide tube exhibits nevertheless a sufficient distance with respect to the orifice opening, so that the exit opening 6 is preserved. By means of the resultant axial displacement of the guide tube 5 in the direction of the pour-in opening 3, the packing 10 (which is arranged on the plank 18) reaches the rim of the pour-in opening, and lies against this sealingly, so that the path to the drain openings 9 is blocked.

As is also to be recognized in FIG. 3, the closure flap 2 is pushed into the open position against the operation of the torsion spring (not shown) by means of the refueling nozzle 4.

As is to be recognized further in FIG. 3, the ring collar 4a grabs behind the projection 11, so that the ring collar is securely held between the stop 5b of the guide tube 54 and the projection 11 during the filling process.

Fuel vapors which are pushed out of the tank during filling of the fuel tank stream along the refueling nozzle 4 through the annular gap which remains between the refueling nozzle 4 and the pour-in opening 3 and then proceed between the pegs 15 on the outer side of the guide tube 5. The pour-in opening 3 is large enough to leave this annular gap, which serves as a gas outlet gap. Moreover, the pour-in socket piece 1 has no means of escape for the gases which escape when refueling the tank other than said gas outlet gap. By means of the packing 10, which acts as a guide apparatus, the fuel vapors are prevented from gaining access to the open. Rather, these are led back via the inlet openings 7 into the interior of the guide tube and are sucked off by the openings 19 at the under side of the ring collar 4a of the refueling nozzle 4. By means of the packing it is moreover prevented that air is sucked in via the drain openings 9 and gain access to the gas suck-off system, which would only be additionally loaded by this "false-air". Rather, there streams at the fuel tank closure practically only vapor from the fuel tank into the suck-off system along the arrows designated by P2.

By means of the twisted path of the fuel vapors it is ensured that no fuel droplets, at any rate no large droplets, are carried along with the stream. Rather, these are thrown out out of the stream. This is especially significant, if the fuel refueling nozzle 4 has not yet taken up the end position shown in FIG. 3, but the orifice rim of the refueling nozzle strikes directly on the closure flap 2 and presses this out of the pour-in opening. At this moment fuel vapors often escape, which have accumulated under pressure in the interior of the fuel tank and carry along the fluid fuel, e.g. fuel which drips out of the refueling nozzle.

In the embodiment described in the Figures the lead-apparatus exists for leading the fuel vapors essentially out of the packing 10, which leads the vapors, which stream out via the outlet openings 6, again back into the guide tube 5 via the openings 7. However, it is also possible to omit the drain opening 9, especially when it is taken care in another manner that no dirty water gains access to the pour-in opening 3. In this case the packing 10 can also be omitted, whereby the housing 8 takes over the function of the lead-apparatus. In any event, the lead-apparatus connects the exit openings and the inlet openings so as to confine the flow of gases which flow through said exit openings to an unobstructed moderate flow from said exit openings to said inlet openings.

Having thus described the principles of the invention, together with several illustrative embodiments thereof, it is to be understood that although specific terms are employed, they are used in a generic and descriptive sense, and not for purposes of limitation, the scope of the invention being set forth in the following claims.

We claim:

1. A tank closure which is comprised of (A) self-sealing closure apparatus for a fuel tank arranged at the orifice rim of a pour-in socket-piece (1), which closure apparatus consists of a closure part (2) and a pour-in socket piece having a pour-in opening (3) which is closable by means of the closure part (2), and which is large enough to leave a gas outlet gap between the rim of said opening and a refueling nozzle (4) to be introduced for the gases which escape when refueling the tank, said pour-in socket piece having no means of escape for said gases other than said gas outlet gap; and (B) a guide means (5) for reception of the refueling nozzle, comprising, in combination with said closure apparatus, lead-apparatus for guiding gases, which have escaped through said gas outlet gap, through a moderate-flow passage to the outside of said refueling nozzle, said guide means (5) having a reduced-scale segment (5a) closely surrounding the refueling nozzle (4), said reduced-scale segment (5a) having at the side thereof which is placed toward the pour-in socket-piece (1), an unobstructed exit opening through which the gases freely pass out of the guide means (5) to the outside, said reduced-scale segment (5a) having at the side thereof which faces away from the tank inlet openings (7) through which the gases enter into the interior of the guide means (5), said lead-apparatus connecting the exit opening and the inlet openings so as to confine the flow of gases which flow through said exit opening to an unobstructed moderate flow from said exit opening to said inlet openings.

2. Tank closure according to claim 1, wherein the lead apparatus exhibits a housing (8) which closely surrounds the guide means (5) and the orifice-rim of the pour-in socket-piece (1).

3. Tank closure according to claim 2, wherein the guide means (5) exhibits a stop (5b) for a shoulder (4a) of the refueling nozzle (4).

4. Tank closure according to claim 3, wherein the housing (8) exhibits a projection (11) lying near the stop (5b) for the shoulder (4a) of the refueling nozzle (4), in such a manner that the shoulder (4a) of the refueling nozzle (4) is capable of resting between the stop (5b) and the projection (11).

5. Tank closure according to claim 2, wherein the housing (8) exhibits drain openings (9) at the top of the pour-in opening (3).

6. Tank closure according to claim 5, wherein the drain openings (9) are closeable during filling of the tank.

7. Tank closure according to claim 1, wherein the guide means (5) exhibits a stop (5b) for a shoulder (4a) of the refueling nozzle (4).

8. Tank closure according to claim 1, wherein the guide means (5) is mounted so as to be axially displaceable.

9. Tank closure according to claim 8, wherein the guide means (5) is elastically biased in the direction of the pour-in opening (3).

10. A tank closure which is comprised of (A) self-sealing closure apparatus for a fuel tank arranged at the orifice rim of a pour-in socket-piece (1), which closure apparatus consists of a closure part (2) and a pour-in socket piece having a pour-in opening (3) which is closable by means of the closure part (2), and which is large enough to leave a gas outlet gap between the rim of said opening and a refueling nozzle (4) to be introduced for the gases which escape when refueling the tank, said pour-in socket piece having no means of escape for said gases other than said gas outlet gap; and (B) a guide means (5) for reception of the refueling nozzle, comprising, in combination with said closure apparatus, lead-apparatus for guiding gases, which have escaped through said gas outlet gap, through a moderate-flow passage to the outside of said refueling nozzle, said guide means (5) having a reduced-scale segment (5a) closely surrounding the refueling nozzle (4), said reduced-scale segment (5a) having at the side thereof which is placed toward the pour-in socket-piece (1), an unobstructed exit opening (6) through which the gases freely pass out of the guide means (5) to the outside, said reduced-scale segment (5a) having at the side thereof which faces away from the tank inlet openings (7) through which the gases enter into the interior of the guide means (5), said lead-apparatus connecting the exit opening and the inlet openings so as to confine the flow of gases which flow through said exit opening to an unobstructed moderate flow from said exit opening to said inlet openings, wherein the lead apparatus exhibits a housing (8) which closely surrounds the guide means (5) and the orifice-rim of the pour-in socket-piece (1), wherein the housing (8) exhibits drain openings (9) at the top of the pour-in opening (3), wherein the drain openings (9) are closeable during filling of the tank, and wherein a packing (10), which closes the drain openings (9) when a refueling nozzle is inserted, is arranged on the guide means (5).

11. A tank closure which is comprised of (A) self-sealing closure apparatus for a fuel tank arranged at the orifice rim of a pour-in socket-piece (1), which closure apparatus consists of a closure part (2) and a pour-in socket piece having a pour-in opening (3) which is closable by means of the closure part (2), and which is large enough to leave a gas outlet gap between the rim of said opening and a refueling nozzle (4) to be introduced for the gases which escape when refueling the tank, said pour-in socket piece having no means of escape for said gases other than said gas outlet gap; and (B) a guide means (5) for reception of the refueling nozzle, comprising, in combination with said closure apparatus, lead-apparatus for guiding gases, which have escaped through said gas outlet gap, through a moderate-flow passage to the outside of said refueling nozzle, said guide means (5) having a reduced-scale segment (5a) closely surrounding the refueling nozzle (4), said reduced-scale segment (5a) having at the side thereof which is placed toward the pour-in socket-piece (1), an unobstructed exit opening (6) through which the gases freely pass out of the guide means (5) to the outside, said reduced-scale segment (5a) having at the side thereof which faces away from the tank inlet openings (7) through which the gases enter into the interior of the guide means (5), said lead-apparatus connecting the exit opening and the inlet openings so as to confine the flow of gases which flow through said exit opening to an unobstructed moderate flow from said exit opening to said inlet openings, wherein the lead apparatus exhibits a housing (8) which closely surrounds the guide means (5) and the orifice-rim of the pour-in socket-piece (1), and wherein the housing (8) exhibits run-off openings (9) at the top of the pour-in opening (3).

* * * * *